(12) United States Patent
Hill et al.

(10) Patent No.: US 11,215,120 B2
(45) Date of Patent: Jan. 4, 2022

(54) EXTERNAL MIXING CHAMBER FOR A GAS TURBINE ENGINE WITH COOLED TURBINE COOLING AIR

(71) Applicant: UNITED TECHNOLOGIES CORPORATION, Farmington, CT (US)

(72) Inventors: James D. Hill, W. Abington Township, PA (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1226 days.

(21) Appl. No.: 15/424,927

(22) Filed: Feb. 6, 2017

(65) Prior Publication Data

US 2018/0223736 A1    Aug. 9, 2018

(51) Int. Cl.
| | |
|---|---|
| *F02C 7/18* | (2006.01) |
| *F02C 3/107* | (2006.01) |
| *F01D 25/12* | (2006.01) |
| *F02C 6/08* | (2006.01) |

(52) U.S. Cl.
CPC ............. *F02C 7/185* (2013.01); *F01D 25/12* (2013.01); *F02C 3/107* (2013.01); *F02C 6/08* (2013.01); *F02C 7/18* (2013.01); *F05D 2260/213* (2013.01); *Y02T 50/60* (2013.01)

(58) Field of Classification Search
CPC .. F02C 7/185; F02C 3/107; F02C 6/08; F02C 7/18; F01D 25/12; F05D 2260/213; Y02T 50/676
See application file for complete search history.

(56) References Cited

U.S. PATENT DOCUMENTS

| | | | |
|---|---|---|---|
| 4,933,149 A | * | 6/1990 | Rhee ...................... B01J 8/1827 422/131 |
| 5,468,123 A | | 11/1995 | Guimier et al. |
| 6,612,114 B1 | | 9/2003 | Klingels |
| 8,127,829 B2 | | 3/2012 | Sabatino et al. |
| 8,776,869 B2 | | 7/2014 | Barnes et al. |

(Continued)

OTHER PUBLICATIONS

Extended European Search Report for EP Application No. 18155404.9, dated Jun. 27, 2018.

*Primary Examiner* — Ehud Gartenberg
*Assistant Examiner* — Henry Ng
(74) *Attorney, Agent, or Firm* — Carlson, Gaskey & Olds, P.C.

(57) ABSTRACT

A gas turbine engine comprises a compressor section and a turbine section, the compressor section having a last compressor stage. High pressure cooling air is tapped from a location downstream of the last compressor stage and passed through a heat exchanger. Lower pressure air passes across the heat exchanger to cool the high pressure cooling air. A housing surrounds the compressor section and the turbine section and there being a space radially outwardly of the housing, and a mixing chamber received in the space radially outwardly of the housing, the mixing chamber receiving the high pressure cooling air downstream of the heat exchanger, and further receiving air at a temperature higher than a temperature of the high pressure cooling air downstream of the heat exchanger. Mixed air from the mixing chamber is returned into the housing and utilized to cool at least the turbine section.

6 Claims, 2 Drawing Sheets

(56) References Cited

U.S. PATENT DOCUMENTS

| | | | |
|---|---|---|---|
| 9,243,850 B1 | 1/2016 | Bastian et al. | |
| 2008/0112797 A1 | 5/2008 | Seitzer et al. | |
| 2010/0275611 A1* | 11/2010 | Prabhu | F02C 7/222 |
| | | | 60/780 |
| 2011/0088405 A1 | 4/2011 | Turco | |
| 2012/0297775 A1* | 11/2012 | Prabhu | F02C 3/20 |
| | | | 60/682 |
| 2015/0285095 A1* | 10/2015 | Yeager | F01D 25/30 |
| | | | 415/1 |
| 2015/0354465 A1* | 12/2015 | Suciu | F02C 3/04 |
| | | | 60/782 |
| 2016/0010552 A1* | 1/2016 | Suciu | F02C 7/06 |
| | | | 60/772 |
| 2017/0074106 A1* | 3/2017 | Scoffone | F01D 5/08 |

\* cited by examiner

EXTERNAL MIXING CHAMBER FOR A GAS TURBINE ENGINE WITH COOLED TURBINE COOLING AIR

BACKGROUND OF THE INVENTION

This application relates to a mixing chamber for mixing two air sources in a gas turbine engine to utilize as turbine cooling air.

Gas turbine engines are known and typically include a fan delivering air into a bypass duct as propulsion air and also into a core engine. The air in the core engine enters a compressor where it is compressed and then delivered into a combustor. The air is mixed with fuel and ignited and products of this combustion pass downstream over turbine rotors driving them to rotate.

Historically, a fan drive turbine rotated at a single speed with the fan. However, more recently, a gear reduction has been placed between the fan drive turbine and the fan rotor. This allows the fan to increase in diameter and rotate at slower speeds, which has many beneficial effects.

The fan drive turbine is able to rotate at higher speeds. Temperatures within the gas turbine engine increase with this change for several reasons. Further, the pressure downstream of the combustor also increases.

As can be appreciated, components of the gas turbine engine and, in particular, those in the turbine section, see very high temperatures. It is known to provide cooling air to cool those components. However, due to the increased pressure, it becomes desirable to use highly pressurized air as the cooling air such that it is able to move into the turbine section. The most pressurized air in the gas turbine engine is downstream of a high pressure compressor and it is typically hot.

This high pressure cooling air must be cooled. After cooling, it may be at a temperature too low for effective use under all conditions. Thus, it would be desirable to mix this cooing air with higher temperature air. However, available space for a required mixing chamber becomes difficult to locate within the compact space of the modern gas turbine engine.

SUMMARY OF THE INVENTION

In a featured embodiment, a gas turbine engine comprises a compressor section and a turbine section, the compressor section having a last compressor stage. High pressure cooling air is tapped from a location downstream of the last compressor stage and passed through a heat exchanger. Lower pressure air passes across the heat exchanger to cool the high pressure cooling air. A housing surrounds the compressor section and the turbine section and there being a space radially outwardly of the housing, and a mixing chamber received in the space radially outwardly of the housing, the mixing chamber receiving the high pressure cooling air downstream of the heat exchanger, and further receiving air at a temperature higher than a temperature of the high pressure cooling air downstream of the heat exchanger. Mixed air from the mixing chamber is returned into the housing and utilized to cool at least the turbine section.

In another embodiment according to the previous embodiment, the air at a higher temperature is also the high pressure cooling air which is returned into the mixing chamber.

In another embodiment according to any of the previous embodiments, the high pressure cooling air is tapped from a diffuser section radially outwardly of a combustor located intermediate the compressor section and the turbine section.

In another embodiment according to any of the previous embodiments, the mixed air passes through a compressor diffuser downstream of the last compressor stage.

In another embodiment according to any of the previous embodiments, the mixing chamber has diverters to cause a change in a flow direction from the higher pressure cooling air and the air at a higher temperature.

In another embodiment according to any of the previous embodiments, the diverters cause the higher pressure cooling air to flow in a first circumferential direction and the air at a higher temperature to flow in an opposed circumferential direction.

In another embodiment according to any of the previous embodiments, the mixing chamber has diverters to cause a change in a flow direction from the higher pressure cooling air and the air at a higher temperature.

In another embodiment according to any of the previous embodiments, the diverters cause the higher pressure cooling air to flow in a first circumferential direction and air at a higher temperature to flow in an opposed circumferential direction.

In another embodiment according to any of the previous embodiments, the high pressure cooling air is tapped from a diffuser section radially outwardly of a combustor located intermediate the compressor section and the turbine section.

In another embodiment according to any of the previous embodiments, the mixed air passes through a compressor diffuser downstream of the last compressor stage.

In another embodiment according to any of the previous embodiments, the mixing chamber has diverters to cause a change in a flow direction from the higher pressure cooling air and the air at a higher temperature.

In another embodiment according to any of the previous embodiments, the diverters cause the higher pressure cooling air to flow in a first circumferential direction and the air at a higher temperature to flow in an opposed circumferential direction.

In another embodiment according to any of the previous embodiments, the mixing chamber has diverters to cause a change in a flow direction from the higher pressure cooling air and the air at a higher temperature.

In another embodiment according to any of the previous embodiments, the diverters causing the higher pressure cooling air to flow in a first circumferential direction and the air at a higher temperature to flow in an opposed circumferential direction.

In another embodiment according to any of the previous embodiments, the mixed air passes through a compressor diffuser downstream of the last compressor stage.

In another embodiment according to any of the previous embodiments, the mixing chamber has diverters to cause a change in a flow direction from the higher pressure cooling air and the air at a higher temperature.

In another embodiment according to any of the previous embodiments, the diverters cause the higher pressure cooling air to flow in a first circumferential direction and the air at a higher temperature to flow in an opposed circumferential direction.

In another embodiment according to any of the previous embodiments, the mixing chamber has diverters to cause a change in a flow direction from the higher pressure cooling air and the air at a higher temperature.

In another embodiment according to any of the previous embodiments, the diverters cause the higher pressure cooling air to flow in a first circumferential direction and the air at a higher temperature to flow in an opposed circumferential direction.

In another embodiment according to any of the previous embodiments, the compressor section includes a low pressure compressor and a high pressure compressor and the turbine section including at least a high pressure turbine and a fan drive turbine, and a fan rotor, and the fan drive turbine driving the fan rotor through a gear reduction.

These and other features may be best understood from the following drawings and specification.

DETAILED DESCRIPTION

Figure 1:
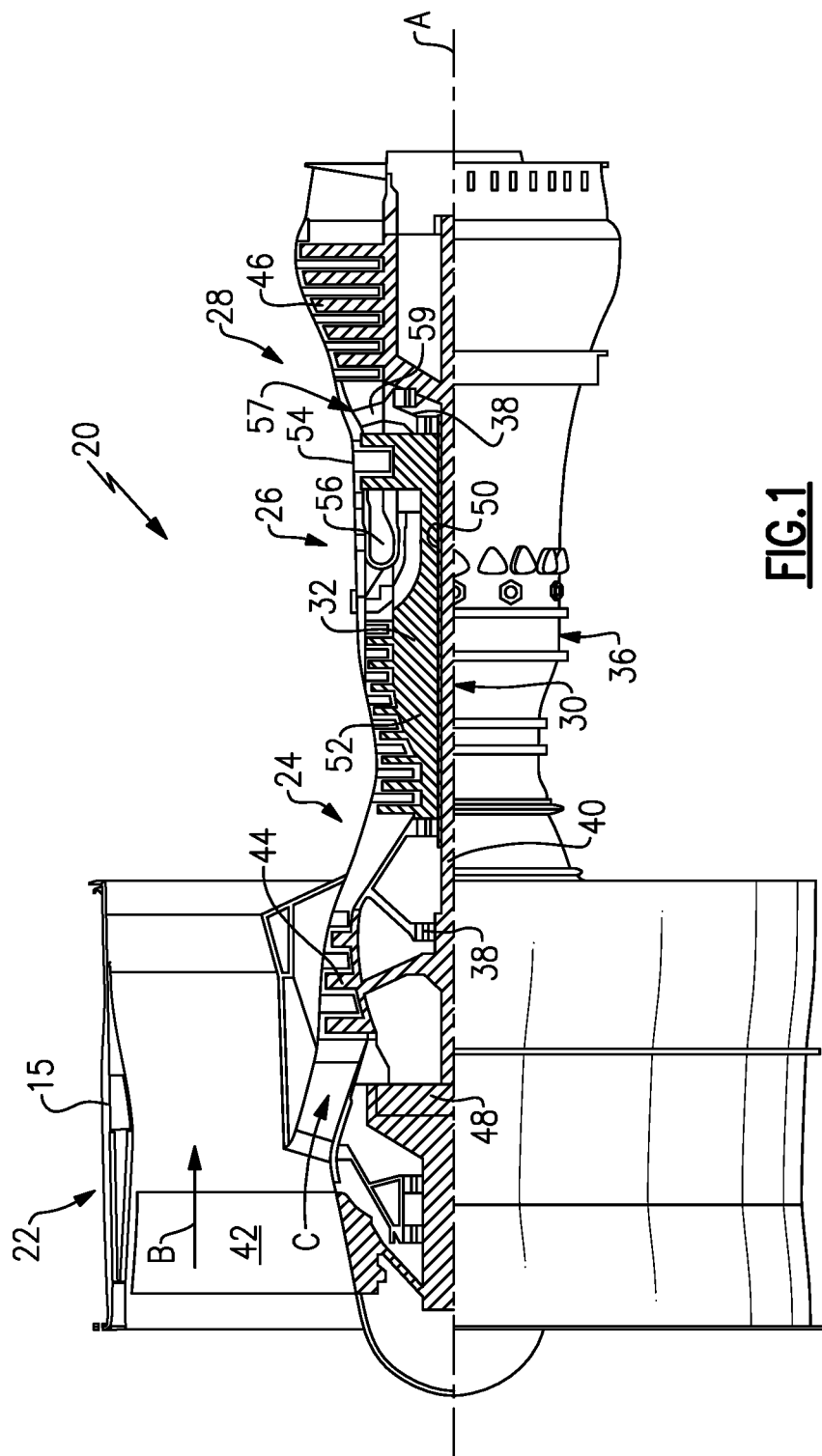
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
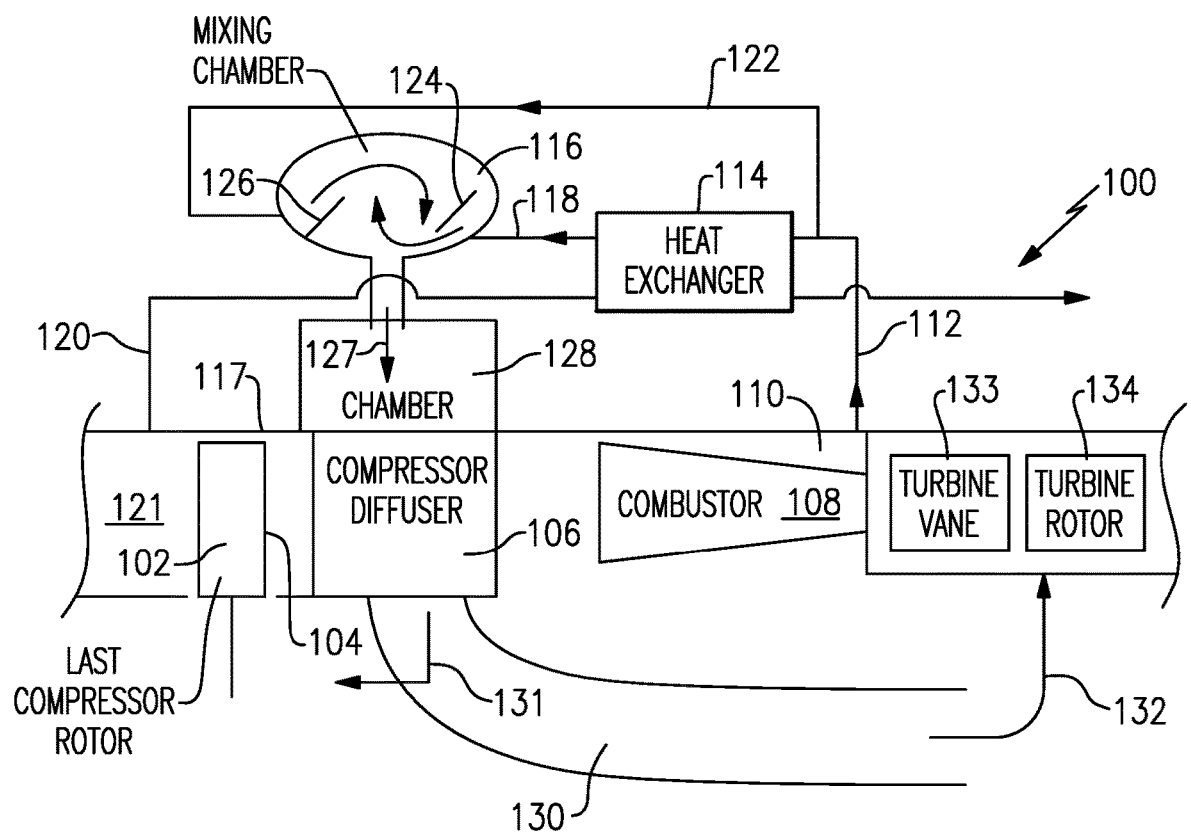
FIG. 2 shows a cooling air system for an engine such as the FIG. 1 engine.

FIG. 2 schematically shows a cooling air system 100 which may be incorporated into a gas turbine engine such as that shown in FIG. 1. A last compressor rotor stage 102 has a downstream end 104. A compressor diffuser 106 is shown downstream of the stage 102. A combustor 108 is shown downstream of the compressor diffuser 106. Products of combustion from the combustor 108 pass over a turbine vane 133 and a first turbine rotor 134.

A diffuser chamber 110 sits radially outwardly of the combustor 108. High pressure cooling air is tapped at line 112 from the diffuser chamber 110. This cooling air passes through a heat exchanger 114, cooling the air from line 112. Downstream of heat exchanger 114, air from line 112 heads into line 118, having been cooled to relatively low temperatures. As an example, the air at tap 112 may be at a high temperature, such as 1300° F., or higher. However, by the time the air reaches line 118, it has been cooled down to temperatures on the order of 500° F.

The air in line 118 passes into a mixing chamber 116. Mixing chamber 116 is radially outwardly of a housing 117 enclosing the compressor 102, diffuser 106, turbine components 133/134 and combustor 108.

By providing the mixing chamber 116 outwardly of the housing, there is more efficient use of the space within the housing 117.

The mixing chamber 116 becomes desirable because the air in line 118 may be at too low a temperature to be utilized to cool the turbine components 133/134 under certain conditions. Thus hot high pressure air 122 may be tapped from line 112, upstream of heat exchanger 114. This air also passes into the mixing chamber 116. As mentioned, the air in line 122 downstream may be at a high temperature.

Now, the air in line 122 can mix within the mixing chamber 116, as explained below.

Air is shown tapped at 120 from a lower pressure location 121 in the compressor section to pass over the heat exchanger 114 to cool the cooled high pressure air.

In the past it has been proposed to mix the high pressure cooling air with the hot air radially inwardly of the housing 117. This can raise challenges with regard to the available space. Moreover, having inlet lines bringing in higher temperature and lower temperature air can cause thermal gradients.

As shown in FIG. 2, the lower pressure cooling air at a high temperature downstream of the heat exchanger 114 passes into line 122 and back into the mixing chamber 116. While the air in line 122 moving into the mixing chamber is shown as that tapped from line 112, any number of other air sources can be utilized to pass back into the mixing chamber 116. That is, it is not necessarily air from line 112 which is sent into the mixing chamber as hot air.

Diverter 124 diverts the air from line 118 and diverter 126 diverts the air from line 122. Essentially, the two airflows now ensure efficient and thorough mixing.

Downstream of the chamber 116, the mixed air passes at 127 into a chamber 128 and then through the compressor diffuser 106. As known, the compressor diffuser 106 may have guide vanes and the air can pass through those guide vanes.

The mixed cooling air then passes into a conduit 130, although some mixed air may pass at 131 to cool the compressor section. The air in conduit 130 passes as shown at 132 to cool a turbine vane 133 and a turbine rotor 134.

It may sometimes be undesirable to pass air as cool as 500° F. through the housing 117 and into the engine. That is, air in line 118 might be too cool compared to the temperature of the turbine section and thus could raise thermal gradients. As such, by thoroughly mixing the air from lines 122 with air from line 118, a desired temperature reaches line 127.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor section and a turbine section, said compressor section having a last compressor stage;
high pressure cooling air tapped from a location downstream of said last compressor stage and passed through a heat exchanger;
lower pressure air passing across said heat exchanger to cool said high pressure cooling air;
a housing surrounding said compressor section and said turbine section and there being a space radially outwardly of said housing, and a mixing chamber received in said space radially outwardly of said housing, said mixing chamber connected to receive said high pressure cooling air at a location downstream of said heat exchanger, and further connected to receive air at a temperature higher than a temperature of said high pressure cooling air taken downstream of said heat exchanger;
mixed air from said mixing chamber returned into said housing and utilized to cool at least said turbine section, said mixing chamber having diverters to cause a change in a flow direction of said high pressure cooling air and said air at a higher temperature;
wherein said air at a higher temperature is tapped from a common point as the high pressure cooling air which is sent into said mixing chamber;
wherein said high pressure cooling air is tapped from a diffuser section radially outwardly of a combustor located intermediate said compressor section and said turbine section; and
wherein said mixed air passes through a compressor diffuser downstream of said last compressor stage.

2. The gas turbine engine as set forth in claim 1, wherein said diverters cause said high pressure cooling air to swirl and air at a higher temperature to swirl.

3. The gas turbine engine as set forth in claim 2, wherein said diverters provide efficient and thorough mixing of said high pressure cooling air and said air at a higher temperature.

4. The gas turbine engine as set forth in claim 1, wherein said compressor section includes a low pressure compressor and a high pressure compressor and said turbine section including at least a high pressure turbine and a fan drive turbine, and a fan rotor, and said fan drive turbine driving said fan rotor through a gear reduction.

5. The gas turbine engine as set forth in claim 4, wherein said diverters provide efficient and thorough mixing of said high pressure cooling air and said air at a higher temperature.

6. The gas turbine engine as set forth in claim 1, wherein said diverters provide efficient and thorough mixing of said high pressure cooling air and said air at a higher temperature.

* * * * *